United States Patent [19]
Hastings

[11] Patent Number: 5,033,198
[45] Date of Patent: Jul. 23, 1991

[54] FOUR-WHEEL ALIGNMENT SYSTEM
[76] Inventor: William P. Hastings, 10660 Lakefall Dr., Eden Prairie, Minn. 55347
[21] Appl. No.: 517,299
[22] Filed: May 1, 1990
[51] Int. Cl.5 ............................................. G01B 5/255
[52] U.S. Cl. .................................................. 33/203.18
[58] Field of Search ............. 33/203.18, 203.19, 203.2, 33/203; 248/205.1, 225.31, 201

[56] References Cited
U.S. PATENT DOCUMENTS

| 4,285,136 | 8/1981 | Ragan | 33/203.18 |
| 4,569,140 | 2/1986 | Hobson | 33/203.18 |
| 4,782,596 | 11/1988 | Mieling | 33/203.18 |
| 4,815,216 | 3/1989 | Swayne | 33/203.18 |

Primary Examiner—Harry N. Haroian
Attorney, Agent, or Firm—Paul L. Sjoquist

[57] ABSTRACT

A wheel alignment system including four vehicle supporting members and four alignment fixtures is provided. The fixtures may be attached to the supporting members or directly to a vehicle wheel and include a guide block and a plurality of swiveling rim claws to ensure they may be quickly, securely and accurately attached, thereby increasing the speed and accuracy of wheel alignment operations.

9 Claims, 2 Drawing Sheets

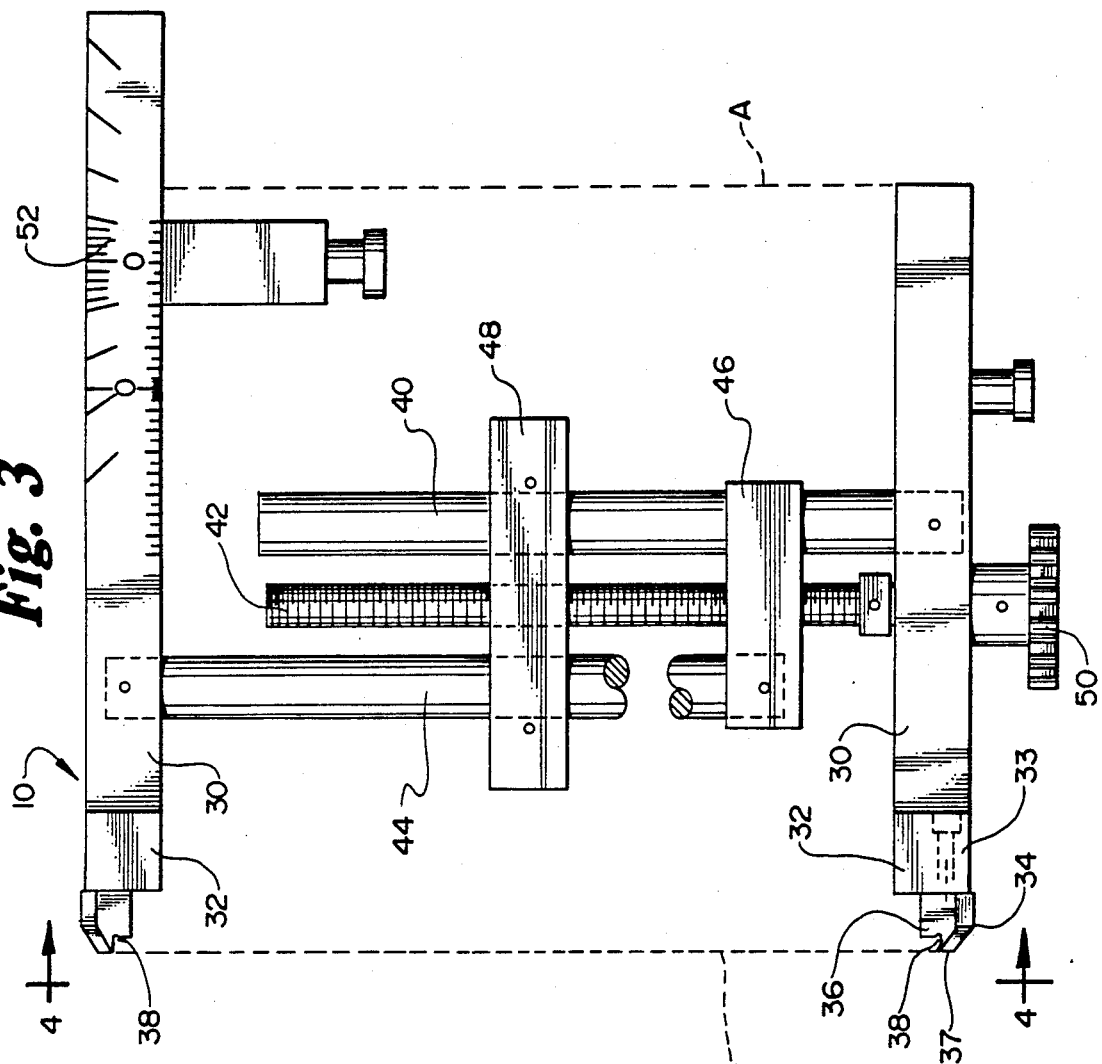
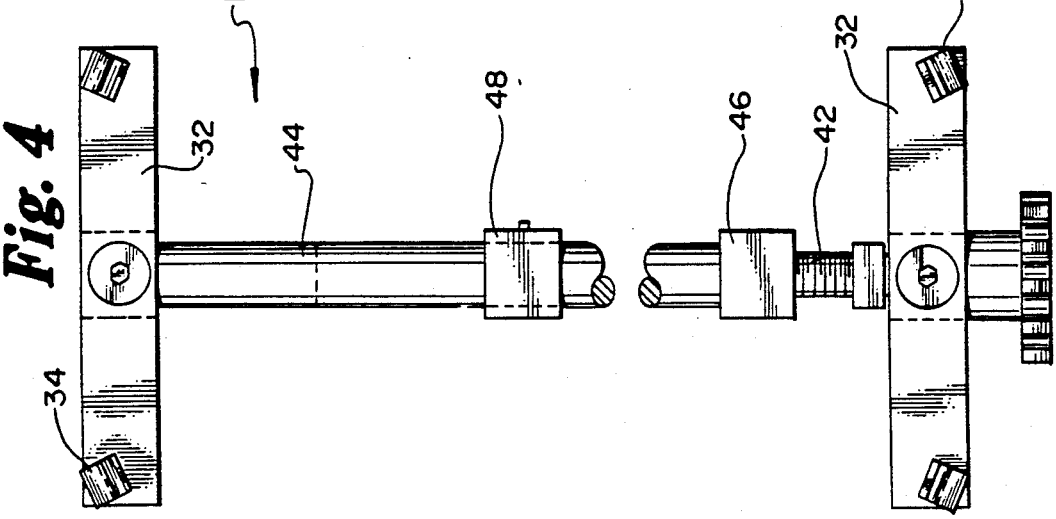

FOUR-WHEEL ALIGNMENT SYSTEM

The present invention relates generally to maintenance equipment for land vehicles and, more particularly, to a system for aligning vehicle wheels.

BACKGROUND OF THE INVENTION

As a result of the proliferation of the automobile and other land vehicles in recent years, there has been equal growth and refinement in the number and kinds of devices used to maintain the vehicles in good operating condition. One such device, provided to insure that a vehicle handles properly and that the tires wear properly, is the wheel alignment device.

In the past, it was usually deemed sufficient that the front wheels of a vehicle were in proper alignment. However, the introduction of unibody vehicle construction has made necessary the alignment of all four wheels supporting a vehicle. If the four wheels are not in proper alignment, the result may be excessive tire wear and poor handling, plus more frequent replacement of other vehicular components such as shock absorbers, springs and steering components.

U.S. Pat. No. 4,782,596 discloses a wheel aligning device and method of using the device wherein a rigid member is attached to a vehicle strut assembly in place of the wheels. The device includes a projecting hub so that a camber gauge may be supported thereon and includes a height adjustment feature comprising a rotatable block member.

While the above-noted patent represents an advance in the keeping of a vehicle's wheels in proper alignment and increases the efficiency of wheel alignment procedures, some problems have remained unaddressed. Specifically, while the device disclosed in U.S. Pat. No. 4,782,596 improves the speed and efficiency with which the front wheels of a vehicle can be aligned, there is still the difficulty of quickly and accurately attaching diagnostic equipment such as camber gauges to the device. Additionally, there is no discussion or provision for the quick and accurate wheel alignment while the vehicle wheels remain in place.

Thus, it would be beneficial to have an improved wheel aligning device which may be connectable to and used with the device described in U.S. Pat. No. 4,782,596, to any similar device, or directly to the vehicle wheels.

SUMMARY OF THE INVENTION

It is an object of the present invention to provide a new and improved wheel aligning system whereby the speed and accuracy of wheel alignment operations may be further improved.

Another object of the present invention is to provide a new and improved wheel alignment fixture whereby the fixture may be used with known wheel alignment devices or may be used directly on the vehicle wheels without removing them.

Yet another object of the present invention is to provide an improved wheel alignment system for which no extra adapters are necessary, no extra equipment is necessary and which is accurate, simple to use and does not require expensive lifts or alignment racks.

A four-wheel alignment system including four vehicular support members for attachment to a vehicle's strut assembly is provided. Additionally, four alignment diagnostic fixtures having linear scales for making various alignment diagnoses are provided. Each fixture includes a glider guide block in the center for increasing accuracy and a number of swivel-connected rim claws for quick, accurate and convenient attachment inside the rim lip of a support member, outside the rim of a support member or directly to a vehicle wheel. The glider guide is slidable for providing accurate support while mounting the fixtures so that the fixtures stay in proper adjustment during tightening to a wheel or support member.

Yet another object of the present invention is to provide a four-wheel alignment system wherein it is convenient and efficient to perform the following diagnostic procedures: four wheel camber, toe-out on turns, caster, wheelbase and tread width compensation, individual front and rear toe, steering wheel centering, thrust line, wheel setback and SAI.

Additional objects, advantages and features of the present invention will become apparent with reference to the following description and the appended drawings and claims.

BRIEF DESCRIPTION OF THE DRAWINGS

FIG. 3 is a top plan view of a fixture of the present invention.

FIG. 4 is an elevational view of the fixture of the present invention taken along line 4—4 in FIG. 3.

DESCRIPTION OF THE PREFERRED EMBODIMENT

Figure 1:
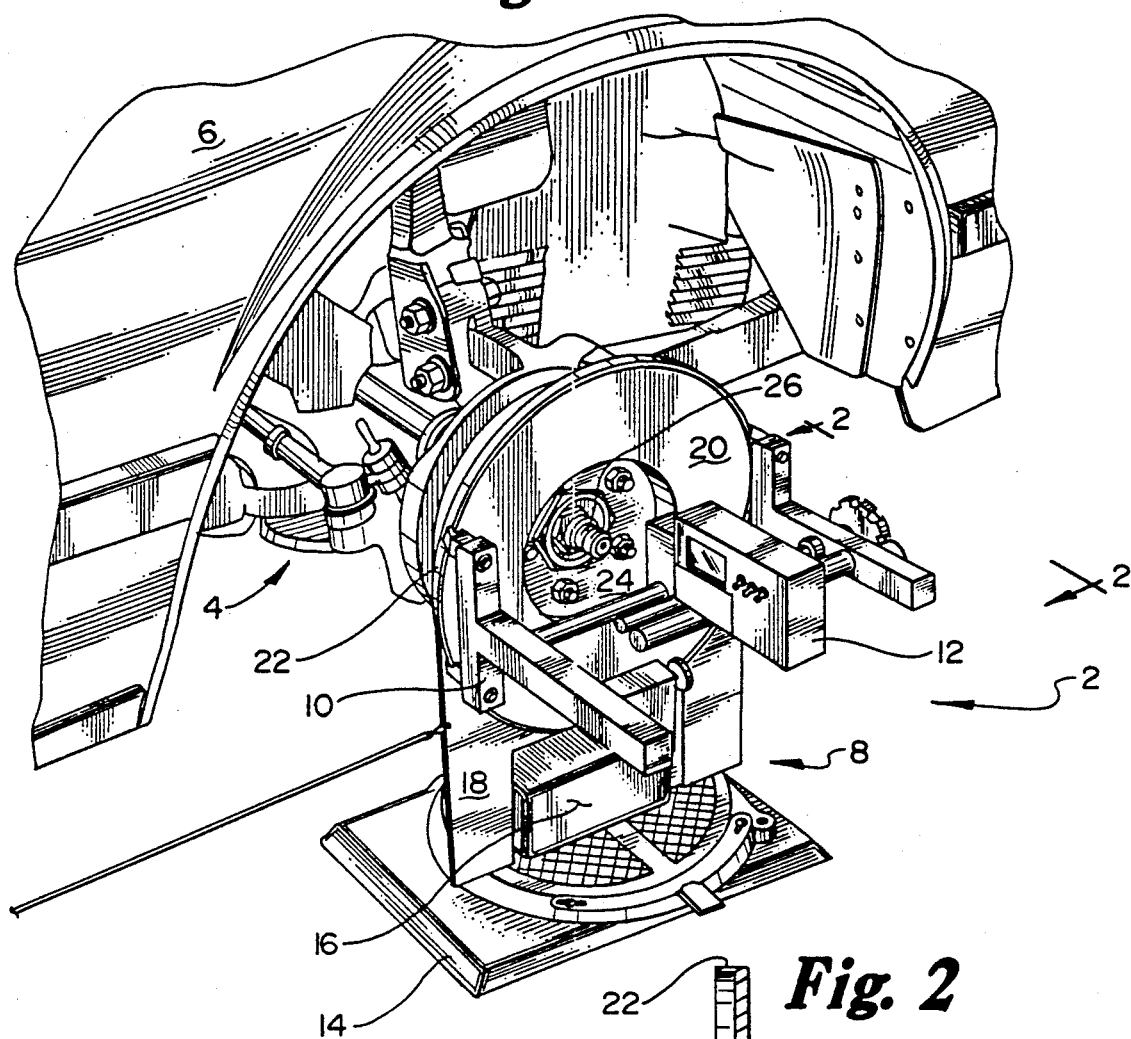
FIG. 1 is a perspective view of a prior art wheel alignment device and the present invention as it may be used therewith.
Figure 2:
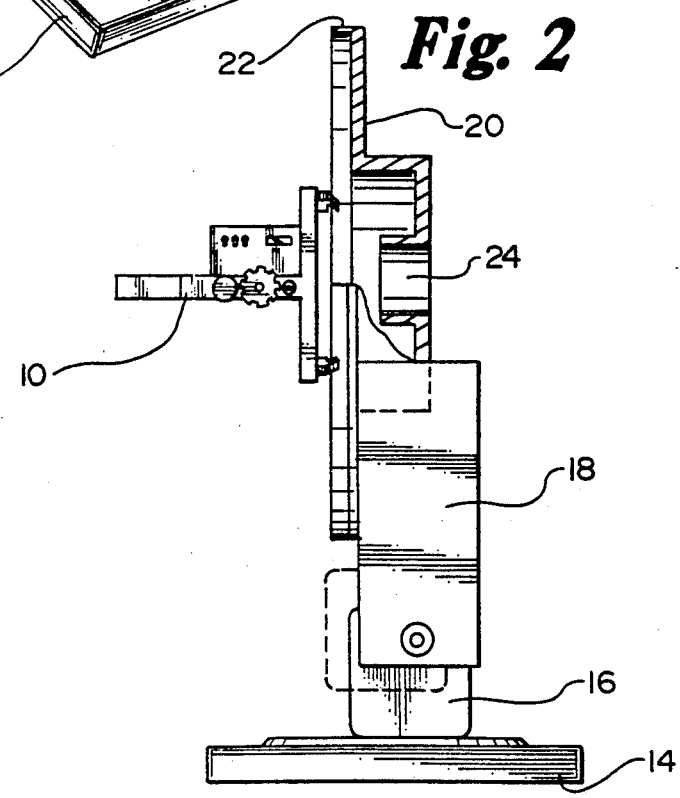
FIG. 2 is a front elevational view along line 2—2 in FIG. 1.

With reference to the drawings, FIG. 1 shows a wheel alignment system 2. The system is shown as it might be attached to the strut assembly 4 of a typical automobile 6. The system 2 incorporates a support assembly 8, a fixture 10 and an electronic sensor or processor 12. Although only one system 2 is shown in FIG. 1, it should be appreciated that the wheel alignment system 2 of the present invention is a four-wheel alignment system and that the system 2 shown in FIG. 1 is only one of four largely similar systems which comprise the present invention.

The vehicular support assembly 8 of the present invention includes turntables or slip plates 14. The turntables 14 provide pivotal and straight-line movement in a horizontal plane to enable the diagnostic and adjustment alignment operations. A base block 16 rests upon the turntable 14 and is pivotally attached to vertical supports 18. At the upper ends of the vertical supports 18, a plate 20 is provided. The plate 20 has an annular lip 22 around the periphery thereof. The annular lip 22 extends outwardly from the plate 20 and from a vehicle 6 when the vehicular support assembly 8 is positioned with reference to a vehicle 6 as shown in FIG. 1. The plate 20 is provided with at least one central hub 24. The hub 24 is adapted to receive the axle ends 26 of a vehicle 6 if necessary, or for the attachment of a certain type of camber gauge (not shown).

The vehicular support assembly 8 described above is commercially available and is well represented and more fully described as the "device 10" in U.S. Pat. No. 4,782,596, cited herein.

Turning now to the fixtures 10 of the present invention, particular reference may be made to FIGS. 3 and 4. Specifically, the fixtures 10 include a pair of spaced, parallel right and left sidebars 30. Right and left claw mounting bars 32 are attached to the ends of the sidebars 30 at the approximate midpoint of the claw mounting bars 32. The claw mounting bars 32 are generally perpendicular to the sidebars 30 and may be attached by appropriate means including typical nut-and-bolt arrangements, welding or a typical socket headbolt and bore arrangement.

At the respective ends of the claw mounting bars 32, the fixtures 10 are provided with rim claws 34. The rim claws 34 are attached to the claw mounting bars 32 at or near the ends thereof and on one side thereof. As shown in FIG. 3, the rim claws 34 are attached to the claw mounting bars 32 by a strip bolt and dowel pin arrangement 33 whereby a rim claw 34 may be turned in a complete circle, that is, through a full 360°. The rim claws 34 comprise a block section 36, which receives the bolt for attaching a claw 34 to the bar 32, and a claw tip portion 37 having an inner radius 38.

With further reference to FIGS. 3 and 4, it can be seen that the fixture 10 of the present invention includes a plurality of generally tubular, cylindrical rods extending between the sidebars 30. The rods include a retracting rod 40, a central screw rod 42 and a stabilizer rod 44. These three rods are generally parallel and the retracting and stabilizer rods 40, 44 respectively, may have a larger diameter than the central screw rod 42.

Between the sidebars 30 and in generally the same plane as the rods, the fixture 10 is provided with a glider 46 and a guide block 48.

Both or either of the glider 46 and the guide block 48 may have bodies formed as one piece (as shown) having appropriate apertures therethrough. Alternatively, both or either may be formed as bifurcated or split bodies, the pieces of which may be secured together by appropriate connection means such as set screws. Additionally, both or either may have slidability adjustment features or locks (not shown) to hold them in one place relative to the rods.

One end of the stabilizer rod 44 is fixed to one of the sidebars 30 and extends generally perpendicularly therefrom; the opposite end of the stabilizer rod 44 is received in the glider 46 and fixed thereto. FIG. 3 indicates that the stabilizer rod 44 is the rod which is closest to the claw mounting bars 32. At the outside of the three bars, furthest from the claw mounting bars 32, the retracting rod 40 is fixed to the opposite sidebar 30 and extends through an aperture provided in the glider 46. The central screw rod 42 is attached to the same sidebar 30 as the retracting rod 40 and extends through a threaded aperture provided in the glider 46. The second ends of the retracting rod 40 and the screw rod 42 are free; all three of the rods extend through apertures provided in the guide block 48. A hand knob 50 is provided outside one sidebar 30 and is connected through the sidebar 30 to the screw rod 42 to actuate the turning thereof.

It should be appreciated from the arrangement just described and shown in FIGS. 3 and 4 that turning the hand knob 50 in either direction causes the rotation of the screw rod 42. Because the glider 46 receives the screw rod 42 in a threaded aperture at the approximate center point thereof, it should be appreciated that the glider 46 will be moved in either of two directions between the sidebars 30 depending on which way the hand knob 50 is turned. The movement of the glider 46 will naturally cause the sidebars 30 to be moved toward or away from one another because of the fixed connection between the sidebar 30 and the glider 46 provided by the stabilizer bar 44.

The guide block 48 of the present invention addresses a need heretofore unmet in the prior art. Specifically, absent the guide block 48, as the hand knob 50 is turned, the forces either pulling the sidebars 30 together or spreading them apart may cause the fixture 10 to be skewed. That is, if a pair of lines were stretched between the sidebars 30 as shown in FIG. 3 by dotted lines A and B, the rectangle formed by the lines and the sidebars 30 may be turned into a parallelogram as a result of tightening the fixtures 10 in place. If this happens, it would be extremely difficult to perform diagnostic wheel alignment functions and even to make an adequate, secure connection between the fixtures 10 and the vehicular support assembly 8. The provision of the guide block 48 obviates this problem by keeping the rods in parallel, planar alignment.

The electronics unit 12 shown in FIG. 1 is a digital protractor of the type which are commercially available. It and other commercially available units provide a digital display of level, angle and tilt. The unit 12 shown is of the type manufactured by Schaevitz Corp. of Phoenix, Ariz. In use, the electronics unit 12 may be placed on top of the guide block 48 once the fixture 10 is mounted on the vehicle supporting assembly 8; readings may be taken directly from the unit 12. It should also be noted that the sidebars 30 of the fixtures 10 of the present invention may be marked with the appropriate indicia 52 for performing the various diagnostic tests (turning angle, toe, etc.) during the wheel alignment process.

In use, the fixtures 10 of the present invention may be used with the vehicular support assembly 8 described herein and in U.S. Pat. No. 4,782,596. However, it should also be appreciated that the fixtures 10 may be used directly on a vehicle wheel (not shown). That is, the rim claws 34 are adapted to be placed directly on a wheel rim without removing the wheel from the vehicle. Additionally, another advantage of the fixture 10 of the present invention, and the rim claws 34 thereof, is that the fixture 10 may be placed with the swivel connected rim claws 34 either outside or inside the annular lip 22 of the vehicle supporting assembly 8. A placement outside the annular lip 22 and an appropriate tightening of the hand knob 50 will cause the fixture 10 to tighten, pulling inwardly against the annular lip 22; swiveling the rim claws 34 approximately 180°, it is possible to cause the fixture 10 to be fixed in place relative to the annular lip 22 by an outwardly extending or expansion force.

For use directly on a vehicle wheel (not shown), pre-alignment checks such as tire pressure, ride height and suspension checks should be carried out before the fixture 10 is placed on the wheel.

The fixtures 10 are attached on the wheels by positioning them generally horizontally across the wheel. The fixtures 10 may be visually leveled; all four rim claws 34 must be in contact with the inside or outside of the wheel rim; the hand knob 50 can be operated in the required direction to cause the fixture 10 to be tightened in place. The guide block 48 will insure that the rods remain parallel and will enhance the accuracy of the various diagnostic assessments which may be carried out by the electronics unit 12 such as caster, camber, toe or other tests as needed.

It should be appreciated that if only a front wheel alignment is desired, two fixtures 10, one on each side of the vehicle, may be used. Alternatively, if all four wheels must be aligned or other diagnostic procedures such as consideration of the wheel base, individual front and rear toe, thrust line or individual four-wheel camber, are to be carried out, one fixture 10 may be mounted on each vehicle wheel.

If using vehicular support assemblies 8 with the fixtures 10 rather than using the fixtures 10 on a vehicle wheel, attachment and positioning of the vehicle support assemblies 8 may be accomplished in accordance with the teachings expressed in U.S. Pat. No. 4,782,596. The fixtures 10 may be attached to the support assemblies 8 just as if attaching them to a wheel as outlined above.

The four-wheel wheel alignment system of the present invention may take different forms within the scope of the invention. In certain embodiments various other commercially available electronics units or non-electronic diagnostic gauges or devices might be used to make alignment diagnoses. The same electronics units may also be used to check strut angles or that the level of the rack and pinon is the same on both sides of a vehicle. Various forms of turntables and/or slip plates 14 or other devices permitting the movement of the wheel or the vehicle support assembly 8 might be used in conjunction with the fixtures 10 of the present invention. A specifically configured and designed tool box (not shown) may be provided to house the vehicle support assemblies 8 and the fixtures 10, along with the various other pieces of equipment such as the electronics unit, various worksheets, specifications and manuals. Additionally, a basic tool kit may be provided for use with the system of the present invention for making caster, camber and toe corrections more efficient and accurate; alignment supplies such as rear wheel shims, camber wedges, bushings or other required supplies may be provided.

It will be understood that I have provided a new and improved four-wheel wheel alignment system 2 incorporating fixture 10 which increases the efficiency and accuracy with which wheel alignments can be done. My fixture 10 may be used with current wheelless wheel alignment technology as discussed herein or it may be used directly on vehicle wheels. Advantages of my invention include that no extra adapters are required; it is accurate, simple to use and requires little maintenance; it does not require expensive lifts or alignment racks and it reduces wheel alignment performance time by up to 75%.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. A diagnostic fixture for use in wheel alignment operations, comprising:
   (a) a pair of spaced parallel sidebars each having a first end and a second end;
   (b) a pair of claw mounting bars perpendicularly affixed to said second ends of said sidebars;
   (c) a plurality of generally tubular rods extending substantially between said sidebars, including a retracting rod, a screw rod and a stabilizer rod, said rods having two ends, one end of said screw rod and one end of said retracting rod attached to the first of said sidebars and the respective other ends being free, one end of said stabilizer rod being attached to the second of said sidebars and the second end of the stabilizer rod extending toward the first sidebar, said rods being generally parallel with respect to one another and perpendicular to said sidebars; and
   (d) a glider attached to said second end of said stabilizer rod, said glider received on said rods and said glider having a threadable connection to said screw rod; and
   (e) a guide means slidably received on said rods, said guide means having apertures for slidably receiving said rods, including an aperture for receiving said screw rod, said aperture having a diameter greater than the outside diameter of said screw rod, said guide means for retaining said rods in parallel relationship.

2. The diagnostic fixture according to claim I, wherein each of said claw mounting bars has a first upper end and a second lower end, each bar extending therebetween and attached to said sidebars at the approximate midpoint of each claw mounting bar, and wherein each of said claw mounting bars has a pair of rim claws attached thereto, one of said claws attached near said first end and the other of said claws attached near said second end.

3. The diagnostic fixture according to claim 2, wherein said rim claws are pivotally attached to said claw mounting bar.

4. The diagnostic fixture according to claim 2, wherein said sidebars are marked with indicia.

5. The diagnostic fixture according to claim 1, wherein said screw rod is threaded and extends through said glider, in a complementary threaded aperture in said glider, whereby said glider may be moved along the length of said screw rod.

6. The diagnostic fixture according to claim 1, wherein said guide an upper generally flat surface for supporting a diagnostic gauge for use during wheel alignment.

7. A wheel alignment system for aligning a vehicle's wheels, including at least two rigid members each supported by a support means and a base means, each of said rigid members having generally central hub means and generally peripheral lip means, wherein the improvement comprises:
   (a) at least two fixture means each adapted to be tightly secured to said lip means of one of said rigid members, said fixture means for supporting a diagnostic means; each of said fixture means further comprising a pair of spaced, parallel horizontal sidebars movable toward and way from each other in a plane, said sidebars having a first end and a second end, a pair of spaced parallel vertical claw mounting bars perpendicularly affixed to the second ends of said sidebars, three rod means extending substantially between said sidebars, said rod means for actuating and guiding the movement of said sidebars, and a plurality of swiveling claws pivotally attached to said claw mounting bars;
   (b) a diagnostic means in close adjacent proximity to said fixture means, said diagnostic means for performing wheel alignment diagnoses.

8. The wheel alignment system of claim 7, wherein said fixture means comprises a pair of spaced, parallel horizontal sidebars movable toward and away from each other in a plane, said sidebars having a first end and a second end, a pair of spaced parallel vertical claw mounting bars perpendicularly affixed to the second ends of said sidebars, three rod means extending substantially between said sidebars, said rod means for actuating and guiding the movement of said sidebars, and a plurality of swiveling claws pivotally attached to said claw mounting bars.

9. The wheel alignment system of claim 7, wherein said diagnostic means is an electronic protractor.

* * * * *